United States Patent
Armer et al.

(10) Patent No.: US 9,120,560 B1
(45) Date of Patent: Sep. 1, 2015

(54) VERTICAL TAKE-OFF AND LANDING AIRCRAFT

(71) Applicant: Latitude Engineering, LLC, Tucson, AZ (US)

(72) Inventors: Charles Justin Armer, Tucson, AZ (US); Bayani R. Birkinbine, Tucson, AZ (US); Thomas J. Cleary, St. Charles, MO (US); Sean C. Culbertson, Tucson, AZ (US); Jason M. Douglas, Tucson, AZ (US); Carlos V. Murphy, Tucson, AZ (US); Manu Singh, Tucson, AZ (US)

(73) Assignee: Latitude Engineering, LLC, Tucson, AZ (US)

( * ) Notice: Subject to any disclaimer, the term of this patent is extended or adjusted under 35 U.S.C. 154(b) by 143 days.

(21) Appl. No.: 13/648,706

(22) Filed: Oct. 10, 2012

Related U.S. Application Data

(60) Provisional application No. 61/546,569, filed on Oct. 13, 2011.

(51) Int. Cl.
*B64C 27/08* (2006.01)
*B64C 27/26* (2006.01)
*B64C 29/00* (2006.01)

(52) U.S. Cl.
CPC ............ *B64C 29/0008* (2013.01); *B64C 27/08* (2013.01); *B64C 27/26* (2013.01); *B64C 29/0016* (2013.01); *B64C 29/0025* (2013.01)

(58) Field of Classification Search
CPC ............ B64C 29/0008; B64C 29/0016; B64C 29/0025; B64C 27/08; B64C 27/26

USPC ............ 244/17.11, 17.23, 12.1, 6, 7 R, 12.3; D12/326–328, 335, 339
See application file for complete search history.

(56) References Cited

U.S. PATENT DOCUMENTS

| | | | | |
|---|---|---|---|---|
| 1,726,062 A | * | 8/1929 | Gilman | 244/48 |
| D178,598 S | * | 8/1956 | Fletcher | D12/327 |
| 3,181,810 A | * | 5/1965 | Olson | 244/7 R |
| 3,246,861 A | * | 4/1966 | Curci | 244/7 A |
| 5,823,468 A | * | 10/1998 | Bothe | 244/2 |
| 6,607,161 B1 | * | 8/2003 | Krysinski et al. | 244/7 A |
| 7,267,300 B2 | | 9/2007 | Heath et al. | |
| 7,398,946 B1 | | 7/2008 | Marshall | |
| 7,789,342 B2 | * | 9/2010 | Yoeli | 244/23 B |
| 8,646,720 B2 | * | 2/2014 | Shaw | 244/17.23 |
| 2003/0085319 A1 | * | 5/2003 | Wagner et al. | 244/12.3 |

(Continued)

*Primary Examiner* — Tien Dinh
*Assistant Examiner* — Steven Hawk
(74) *Attorney, Agent, or Firm* — Michael W. Goltry; Robert A. Parsons; Parsons & Goltry

(57) ABSTRACT

A vertical take-off and landing aircraft includes a fixed wing airframe having opposed left and right wings extending from left and right sides, respectively, of a fuselage having opposed leading and trailing extremities and an empennage located behind the trailing extremity. Four fixed, open and horizontal, vertical take-off and landing (VTOL) thrust rotors are mounted to the airframe in a quadrotor pattern for providing vertical lift to the aircraft, and a vertical, forward thrust rotor is mounted to the trailing extremity of the fuselage between the trailing extremity of the fuselage and the empennage for providing forward thrust to the aircraft. The four VTOL thrust rotors are coplanar being and operating in a common plane that is parallel relative to, and being level with, top surfaces of the left and right wings in and around a region of each of the four VTOL thrust rotors.

20 Claims, 11 Drawing Sheets

(56) References Cited

U.S. PATENT DOCUMENTS

| | | | |
|---|---|---|---|
| 2004/0245374 A1* | 12/2004 | Morgan | 244/12.3 |
| 2005/0230519 A1* | 10/2005 | Hurley | 244/7 C |
| 2007/0018035 A1 | 1/2007 | Saiz et al. | |
| 2009/0008499 A1* | 1/2009 | Shaw | 244/17.23 |
| 2011/0001020 A1* | 1/2011 | Forgac | 244/7 A |
| 2012/0119016 A1* | 5/2012 | Shaw | 244/12.3 |

\* cited by examiner

VERTICAL TAKE-OFF AND LANDING AIRCRAFT

FIELD OF THE INVENTION

The present invention relates to aerial vehicles and, more particularly, to unmanned aerial vehicle or drones.

BACKGROUND OF THE INVENTION

An unmanned aerial vehicle (UAV), commonly known as a drone, is an aircraft without a human pilot onboard. The flight of a drone is controlled autonomously by computers in the vehicle, or under remote control of a navigator or pilot on the ground or in another vehicle.

One class of drone is the vertical take-off and landing (VTOL) drone. There are many examples of VTOL drones in the prior art. Some exemplary VTOL drones incorporate tilt rotors, such as two large propellers mounted to the ends of an abbreviated wing designed to tilt the propellers from a vertical position for VTOL maneuvering to a horizontal position for normal flight. This "tilt-rotor" design is effective but is difficult to engineer and construct, and is inherently unstable between the vertical and horizontal positions of the propellers. Another exemplary class of VTOL drones utilizes redirected thrust, which incorporate turbofan/jet engines that produce tremendous amounts of directed thrust, which is redirected downward for VTOL maneuvers. As with the well-known tilt-rotor design, VTOL drones that incorporate redirected thrust systems are difficult to engineer and construct and are inherently unstable between the direct and redirected thrust orientations. Furthermore, the turbofan/jet engines of redirected thrust VTOL drones are prone to overheating and failure during prolonged VTOL maneuvering, which, of course, prevents redirected thrust VTOL drones from engaging in persistent VTOL maneuvers.

In an effort to solve these and other and other deficiencies in tilt-rotor and redirected thrust VTOL drone designs, skilled artisans have developed fixed wing VTOL drones with independently powered VTOL thrusters housed in thruster housings, and an independently powered horizontal thruster. Although this arrangement provides better stability during the transition between VTOL maneuvers and horizontal flight, unwanted buffeting occurs between the thruster housings and the thrusters during VTOL maneuvers, and the thruster housings produce drag and reduce vehicle maneuverability during forward flight operations, which tends causes the horizontal thruster to overheat or otherwise run at unacceptably high temperatures that can lead to a premature and potentially catastrophic engine failure.

SUMMARY OF THE INVENTION

According to the principle of the invention, a vertical take-off and landing aircraft includes a fixed wing airframe having opposed left and right wings extending from left and right sides, respectively, of a fuselage having opposed leading and trailing extremities and an empennage located behind the trailing extremity, the left and right wings each having opposed top and bottom surfaces. There are four fixed, open and horizontal, vertical take-off and landing (VTOL) thrust rotors mounted to the airframe in a quadrotor pattern for providing vertical lift to the aircraft. A vertical, forward thrust rotor mounted to the trailing extremity of the fuselage between the trailing extremity of the fuselage and the empennage for providing forward thrust to the aircraft, and the four VTOL thrust rotors are coplanar being and operating in a common plane that is parallel relative to, and being level with, top surfaces of the left and right wings in and around a region of each of the four VTOL thrust rotors. Each of the four VTOL thrust rotors is driven by an electric motor, and the vertical, forward thrust rotor is drive by an internal combustion engine. The four VTOL thrust rotors include left front and rear VTOL thrust rotors located outboard of the left side of the fuselage between the leading extremity of the fuselage and the empennage, and right front and rear VTOL thrust rotors located outboard of the right side of the fuselage between the leading extremity of the fuselage and the empennage. The left front and right front VTOL thrust rotors are equidistant with respect to the left and right wings, respectively, and the fuselage. The left rear and right rear VTOL thrust rotors are equidistant with respect to the left and right wings, respectively, and the fuselage. The left front VTOL thrust rotor is diametrically opposed with respect to the right front VTOL thrust rotor, the left rear VTOL thrust rotor is diametrically opposed with respect to the right rear VTOL thrust rotor, the left front VTOL thrust rotor is in-line with respect to the left rear VTOL thrust rotor, and the right front VTOL thrust rotor is in-line with respect to the right rear VTOL thrust rotor.

According to the principle of the invention, a vertical take-off and landing aircraft includes a fuselage having opposed leading and trailing extremities and opposed left and right sides. Opposed left and right wings extend from the left and right sides, respectively, of the fuselage between the opposed leading and trailing extremities of the fuselage. The left and right wings each have opposed leading and trailing edges, and opposed top and bottom surfaces extending between the opposed leading and trailing edges. Opposed left and right tail booms are coupled between the opposed left and right wings, respectively, and an empennage behind the trailing extremity of the fuselage. Opposed left and right head booms are coupled to the left and right wings, respectively, and extend forwardly of the leading edges of the left and right wings, respectively. The aircraft has a plurality of fixed, open and horizontal vertical take-off and landing (VTOL) thrust rotors for providing vertical lift to the aircraft, including a left front VTOL thrust rotor mounted to the left head boom support and being positioned forwardly of the leading edge of the left wing outboard of the left side of the fuselage near the leading extremity of the fuselage, a left rear VTOL thrust rotor mounted to the left tail boom support and being positioned rearwardly of the trailing edge of the left wing outboard of the left side of the fuselage near the trailing extremity of the fuselage, a right front VTOL thrust rotor mounted to the right head boom support and being positioned forwardly of the leading edge of the right wing outboard of the right side of the fuselage near the leading extremity of the fuselage, a right rear VTOL thrust rotor mounted to the right tail boom support and being positioned rearwardly of the trailing edge of the right wing outboard of the right side of the fuselage near the trailing extremity of the fuselage. The left front VTOL thrust rotor, the left rear VTOL thrust rotor, the right front VTOL thrust rotor, and the right rear VTOL thrust rotor are coplanar being and operating in a common plane that is parallel relative to, and being level with, the top surfaces of the left and right wings in and around a region of each of the left front, left rear, right front, and right rear VTOL thrust rotors, and a vertical, forward thrust rotor is mounted to the trailing extremity of the fuselage between the rear extremity of the fuselage and the empennage for providing forward thrust to the aircraft. Each of the left front, left rear, right front, and right rear VTOL thrust rotors is driven by an electric motor. The vertical, forward thrust rotor is drive by an internal combustion engine. The left head boom support is in-line and coaxial with respect to the left tail boom support. The right head boom support is in-line and coaxial with respect to the right tail boom support. The opposed left and right tail booms are coextensive and parallel with respect to each other, and the opposed left and right head booms are coextensive and parallel with respect to each other. The left front and right front VTOL thrust rotors are equidistant with respect to the left and right wings, respectively, and the fuselage. The left rear and right rear VTOL thrust rotors are equidistant with respect to the left and right wings, respectively, and the fuselage. The left front VTOL thrust rotor is diametrically opposed with respect to the right front VTOL thrust rotor, the left rear VTOL thrust rotor is diametrically opposed with respect to the right rear VTOL thrust rotor, the left front VTOL thrust rotor is in-line with respect to the left rear VTOL thrust rotor, and the right front VTOL thrust rotor is in-line with respect to the right rear VTOL thrust rotor.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
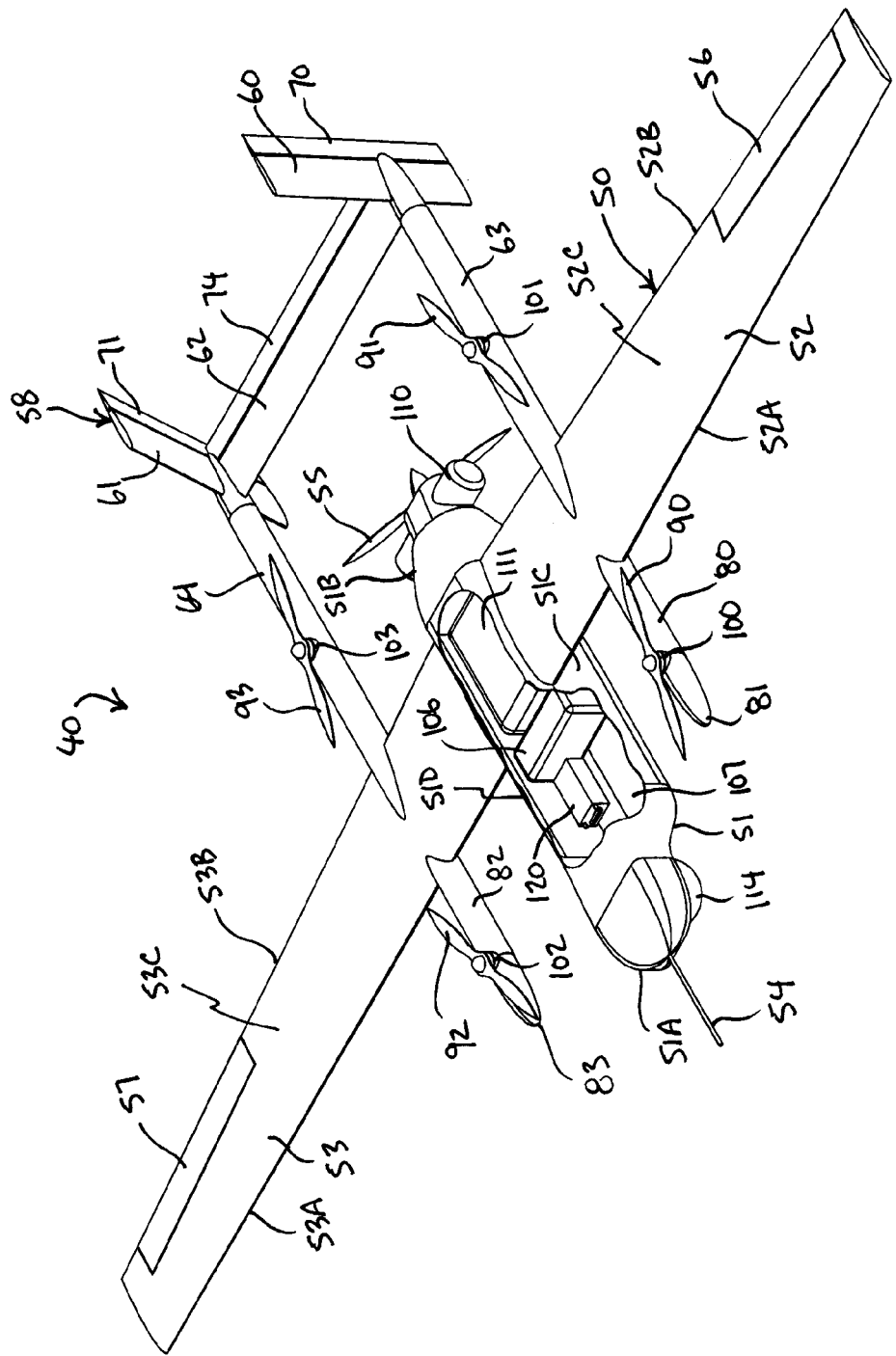
FIG. 1 is a frontal top perspective view of a vertical take-off and landing aircraft constructed and arranged in accordance with the principle of the invention with portions thereof being broken away for illustrative purposes, the aircraft including four vertical thrust rotors for providing vertical take-off and lift, and one forward thrust rotor for providing forward thrust.
Figure 2:
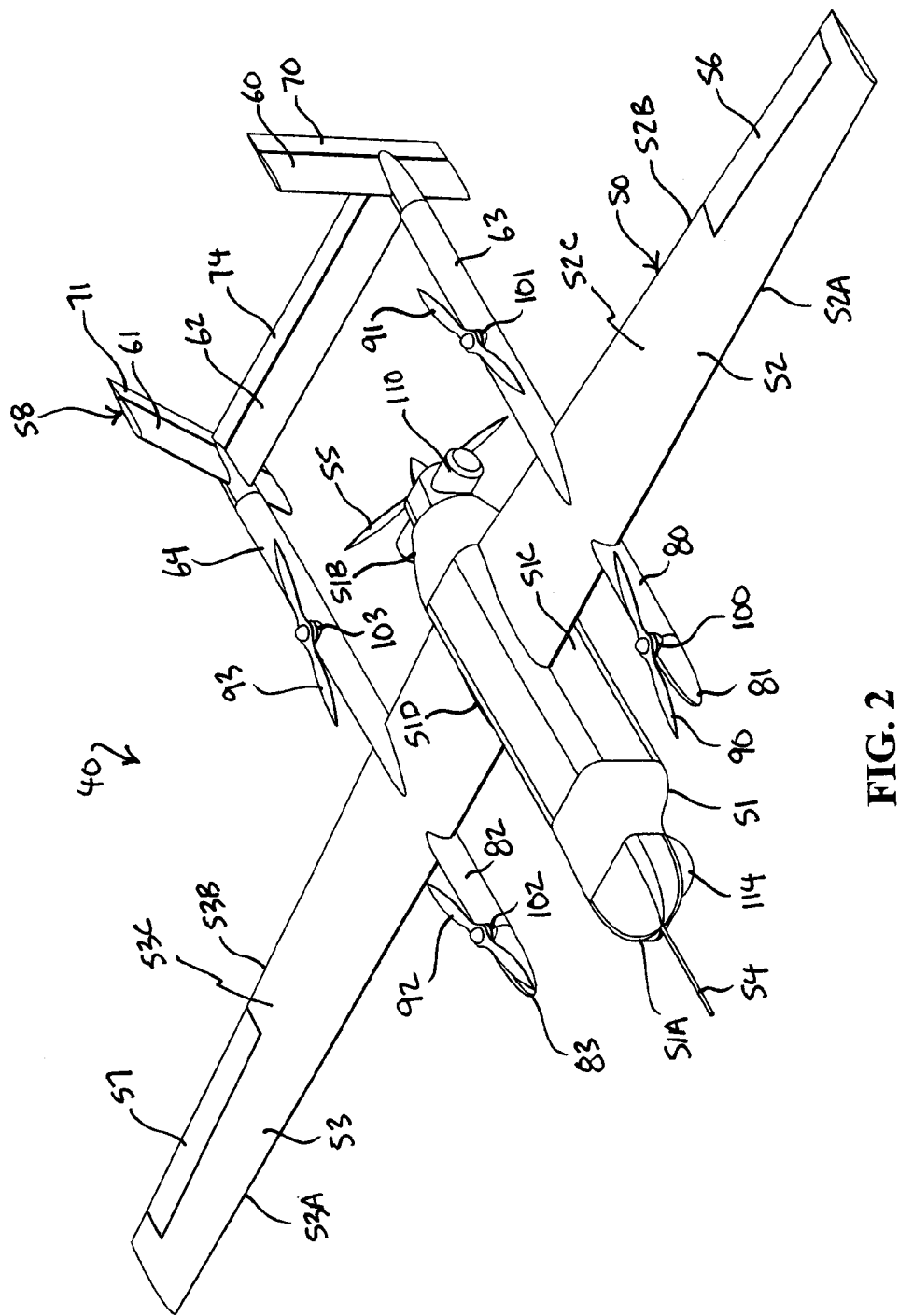
FIG. 2 is a frontal top perspective view of the embodiment of FIG. 1 illustrating the four vertical thrust rotors and the forward thrust rotor as they would appear deactivated.

In general, disclosed herein is a vertical take-off and landing aircraft that includes fixed wing airframe having opposed left and right wings extending from left and right sides, respectively, of a fuselage having opposed leading and trailing extremities and an empennage located behind the trailing extremity for providing stability to the aircraft. Four fixed, open and horizontal, vertical take-off and landing (VTOL) thrust rotors are mounted to the airframe in a quadrotor pattern for providing vertical lift to the aircraft, and a vertical thrust rotor is mounted to the trailing extremity of the fuselage between the trailing extremity of the fuselage and the empennage for providing forward thrust to the aircraft. The four VTOL thrust rotors are coplanar being and operating in a common plane that is parallel relative to, and being level with, top surfaces of the left and right wings in and around a region of each of the VTOL thrust rotors.

Turning now to the drawings, in which like reference characters indicate corresponding elements throughout the several views, attention is directed in relevant part to FIGS. 1-8 illustrating a vertical take-off and landing ("VTOL") aircraft 40 including an airframe 50 consisting generally of a fuselage 51, left and right fixed wings 52 and 53, empennage 58, left and right tail boom supports 63 and 64, and left and right head boom supports 80 and 82. Left and right wings 52 and 53 are fixed to fuselage 51, and so airframe 50 is exemplary of a fixed wing airframe in accordance with the invention. Fuselage 51 has front or leading end/extremity 51A and an opposed rear or trailing end/extremity 51B, opposed left and right sides 51C and 51D extending from and between front or leading extremity 51A and rear or trailing extremity 51B, a left wing 52 and an opposed right wing 53 a vertical/forward thrust rotor 55, and a tail assembly or empennage 58. Left wing 52 and right wing 53 are applied to fuselage 51 and are airfoils that produce lift for flight of aircraft 50 through the atmosphere. Left wing 52 has a left leading edge 52A and an opposed left trailing edge 52B, and a left top surface 52C and an opposed left bottom surface 52D that extend between left leading and trailing edges 52A and 52B. Right wing 53 has a right leading edge 53A and an opposed right trailing edge 53B, and a right top surface 53C and an opposed right bottom surface 53D that extend between right leading and trailing edges 53A and 53B. Left and right wings 52 and 53 are the mirror image of one another, and left wing 52 has a thickness or wing thickness extending from top surface 52C to bottom surface 52D, and right wing 53 has a thickness or wing thickness extending from top surface 53C to bottom surface 53D. The wing thickness of left wing 52 is the same as the wing thickness of right wing 53. During flight, a region of lower-than-normal air pressure is generated over top surfaces 52C and 53C of left and right wings 52 and 53, with a higher pressure existing on bottom surfaces 52D and 53D of left and right wings 52 and 53. The lower air pressure on top surfaces 52C and 53C of left and right wings 52 and 53 generates a smaller downward force on the top surfaces 52C and 53C of left and right wings 52 and 53 than the upward force generated by the higher air pressure on the bottom surfaces 52D and 53D of left and right wings 52 and 53. Hence, a net upward force acts on the left and right wings 52 and 53 to generate lift by the left and right wings 52 and 53. Leading extremity 51A of fuselage 51 is formed with a pitot/static tube 54. Left wing 52 is applied to extends from left side 51C of fuselage 51 at substantially a middle thereof and right wing 53 is applied to and extends from right side 51D of fuselage 51 at substantially a middle thereof. A left aileron 56 is pivotally retained on a rear of left wing 52 near trailing edge 52B of left wing 52 near the outer or distal extremity of left wing 52, and a right aileron 57 is pivotally retained on a rear of right wing 53 near trailing edge 53B of right wing 53 near the outer or distal extremity of right wing 53. Forward thrust rotor 55 is mounted to rear extremity 51B of fuselage 51 between rear extremity 51B and empennage 58 and is capable of providing forward thrust to aircraft 40.

Empennage 58 is the rear part of airframe 50 of aircraft 40, gives stability to aircraft 40, and is located behind and is spaced-apart rearwardly from trailing extremity 51B of fuselage 51. In this embodiment, empennage 58 is exemplary of a twin tail assembly or twin tail empennage including a left vertical stabilizer 60, a right vertical stabilizer 61, and a horizontal stabilizer 62 extending between left and right vertical stabilizers 60 and 61. Left tail boom support 63 and right tail boom support 64 of airframe 50 are coupled between the left and right wings 52 and 53, respectively, and empennage 58. Left tail boom support 63 and right tail boom support 64 support or otherwise carry empennage 58. Left tail boom support 63 and right tail boom support 64 are identical being coextensive and equal in size and shape. Left tail boom support 63 is located along left side 51C of fuselage 51, and is spaced-apart from, or is otherwise located outboard of, left side 51C of fuselage 51 and is parallel with respect to fuselage 51. Right tail boom support 64 is located along right side 51D of fuselage 51, and is spaced-apart from, or is otherwise located outboard of, right side 51D of fuselage 51 and is parallel with respect to fuselage 51. Left and right tail boom supports 63 and 64 are further parallel with respect to each other.

Left tail boom support 63 extends rearward from left wing 52 and trailing edge 52B of left wing 52 to left stabilizer 60 of empennage 58, and right tail boom support 64 extends rearward from right wing 53 and trailing edge 53B of right wing 53 to right stabilizer 61 of empennage 58. Left stabilizer 60 extends upward from a rear of left tail boom support 63, and right stabilizer 61 extends upward from a rear of right tail boom support 64. Horizontal stabilizer 62 is retained between left and right tail boom supports 63 and 64. A rudder 70 is pivotally retained on a rear of left stabilizer 60, and a rudder 71 is pivotally retained on a rear of right stabilizer 61. An elevator 74 is pivotally retained on a rear of horizontal stabilizer 62.

A left head boom support 80 is coupled to left wing 52, and right head boom support 82 is coupled to right wing 53. Left head boom support 80 extends forward from left wing 52 and leading edge 52A of left wing 52 to an outer end 81, and right head boom support 82 extends forward from right wing 53 and leading edge 53A of right wing 53 to an outer end 83. Left head boom support 80 and right head boom support 82 are identical being coextensive and equal in size and shape. Left head boom support 80 is located along left side 51C of fuselage 51, and is spaced-apart from, or is otherwise located outboard of, left side 51C of fuselage 51 and is parallel with respect to fuselage 51. Right head boom support 82 is located along right side 51D of fuselage 51, and is spaced-apart from, or is otherwise located outboard of, right side 51D of fuselage 51 and is parallel with respect to fuselage 51. Left and right head boom supports 80 and 82 are further parallel with respect to each other.

Figure 5:
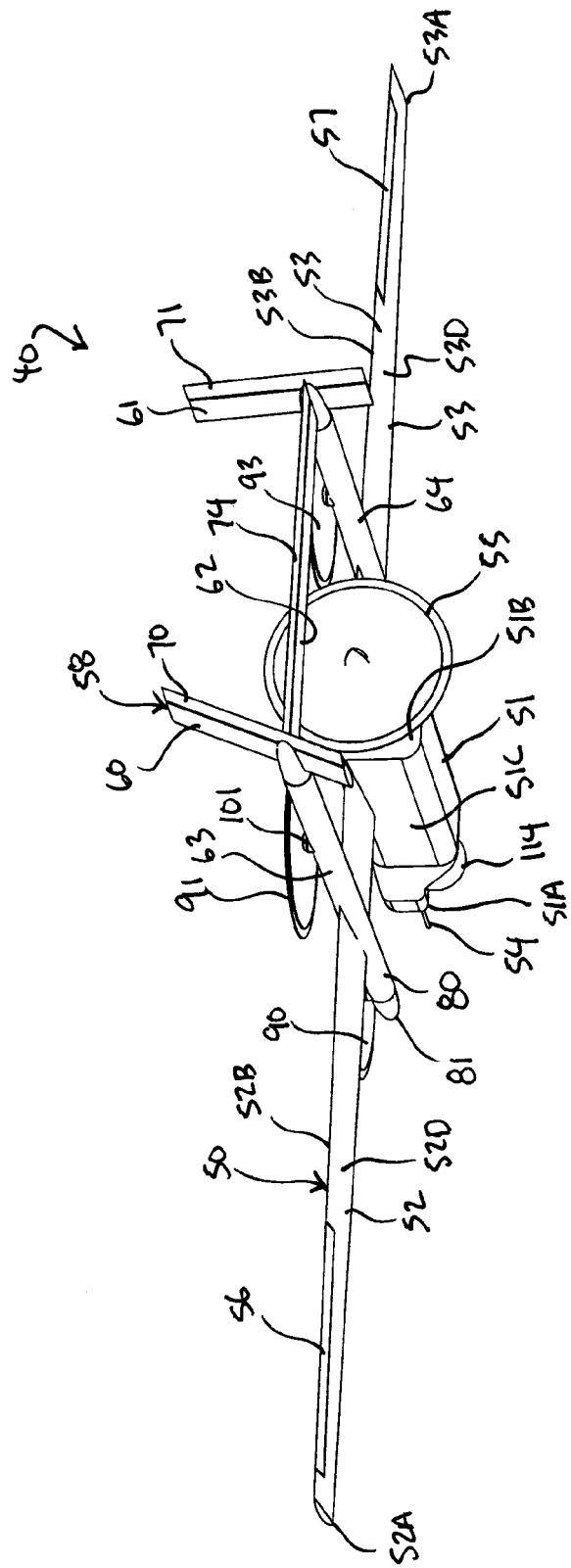
FIG. 5 is a rearward bottom perspective view of the embodiment of FIG. 3.
Figure 6:
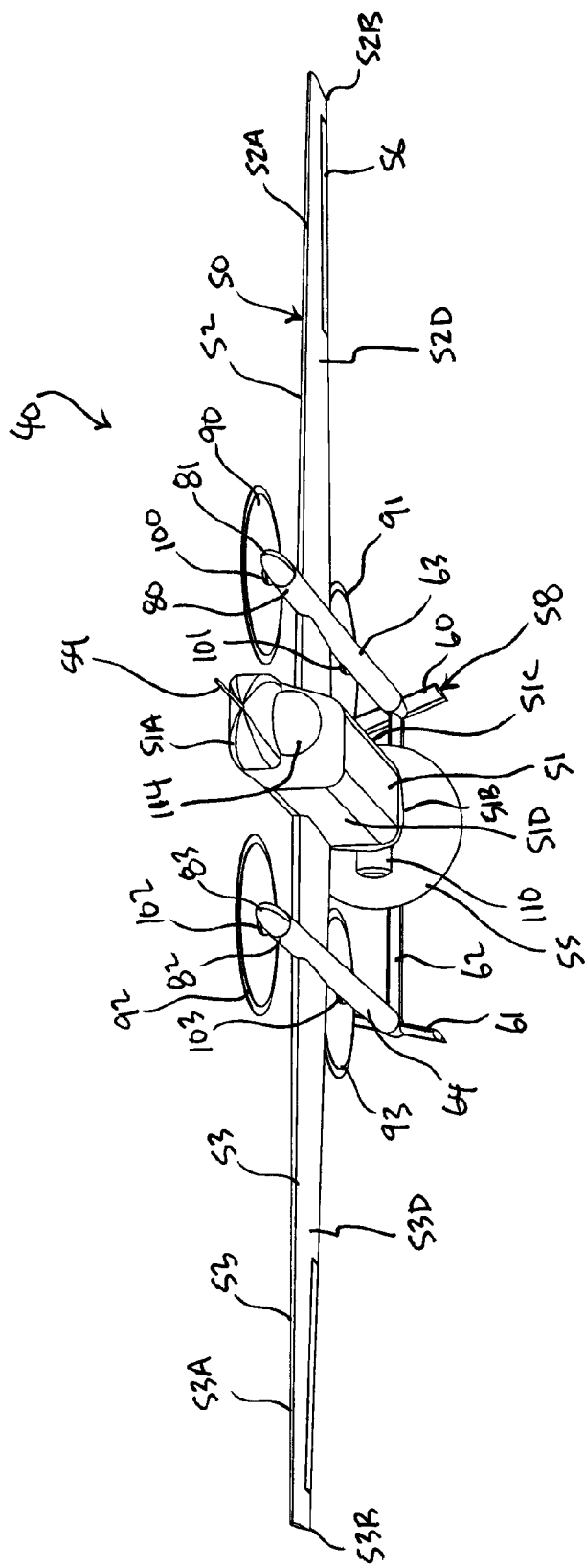
FIG. 6 is a frontal bottom perspective view of the embodiment of FIG. 3.

Left head boom support 80 of airframe 50 is in-line and co-axial with respect to left tail boom support 63, and right head boom support 82 of airframe 50 is in-line and co-axial with respect to right tail boom support 64. As seen in FIGS. 5 and 6, left tail boom support 63 and left head boom support 80 are connected to each other along the underside of left wing 52, and right tail boom support 64 and right head boom support 82 are connected to each other along the underside of right wing 53.

Aircraft 40 is formed with a VTOL propulsion system, or simply a VTOL system, which is a quadrotor VTOL system including a horizontal left front VTOL thrust rotor 90, a horizontal left rear VTOL thrust rotor 91, a horizontal right front VTOL thrust rotor 92, and a horizontal right rear VTOL thrust rotor 93, all of which are mounted to, and carried by, airframe 50, and which are capable of providing vertical lift to aircraft 40. VTOL thrust rotors 90-93 are fixed, open and horizontal VTOL thrust rotors and are mounted to airframe 50 of aircraft 40 in a quadrotor pattern for providing vertical lift to the aircraft as will be explained in detail below. These various horizontal thrust rotors 90-93 are identical and coextensive being equal in size and shape and reside in and along a fixed, common horizontal plane with respect to aircraft 40 airframe 50, and are capable of providing vertical lift to aircraft 40 so as to be useful by aircraft 40 in performing VTOL maneuvers. Left front and rear VTOL thrust rotors 90 and 91 are located outboard of left side 51C of fuselage 51 between leading extremity 51A of fuselage 51 and empennage 58, and right front and rear VTOL thrust rotors 92 and 93 are located outboard of right side 51D of fuselage 51 between leading extremity 51A of fuselage 51 and empennage 58.

Left front VTOL thrust rotor 90 is mounted to and atop left head boom support 80 of airframe 50 along the left side 51C of fuselage 51 and is positioned forwardly of leading edge 52A of left wing 52 outboard of left side 51C of fuselage 51 near leading extremity 51A of fuselage 51 and is positioned near left side 51C of fuselage 51 between left side 51C of fuselage 51 and the outer or distal extremity of left wing 52 formed with aileron 56. Left rear VTOL thrust rotor 91 is mounted to and atop left tail boom support 63 of airframe 50 along the left side 51C of fuselage 51 and is positioned rearwardly of trailing edge 52B of left wing 52 outboard of left side 51C of fuselage 51 near trailing extremity 51B of fuselage 51 and is positioned near left side 51C of fuselage 51 between left side 51C of fuselage 51 and the outer or distal extremity of left wing 52 formed with aileron 56. Right front VTOL thrust rotor 92 is mounted to and atop right head boom support 82 of airframe 50 along the right side 51D of fuselage 51 and is positioned forwardly of leading edge 53A of right wing 53 outboard of right side 51D of fuselage 51 near leading extremity 51A of fuselage 51 and is positioned near right side 51D of fuselage 51 between right side 51D of fuselage 51 and the outer or distal extremity of right wing 53 formed with aileron 57. Right rear VTOL thrust rotor 93 is mounted to and atop right tail boom support 64 of airframe 50 along the right side 51D of fuselage 51 and is positioned rearwardly of trailing edge 53B of right wing 53 outboard of right side 51D of fuselage 51 near trailing extremity 51B of fuselage 51 and is positioned near right side 51D of fuselage 51 between right side 51D of fuselage 51 and the outer or distal extremity of right wing 53 formed with aileron 57.

Left front VTOL thrust rotor 90 is forward of leading edge 52A of left wing 52 and is mounted to and atop left head boom support 80 between leading edge 52A of left wing 52 and outer end 81 of left head boom support 80. Right front VTOL thrust rotor 92 is forward of leading edge 53A of right wing 53 and is mounted to and atop right head boom support 82 between leading edge 53A of right wing 53 and outer end 83 of right head boom support 82. Left front VTOL thrust rotor 90 and right front VTOL thrust rotor 92 are equidistant from, or otherwise with respect to, left and right wings 52 and 53, respectively, and fuselage 51.

Left rear VTOL thrust rotor 91 is rearward of trailing edge 52B of left wing 52 and is mounted to and atop left tail boom support 63 between trailing edge 52B of left wing 52, and empennage 58 and, more specifically, left vertical stabilizer 60 of empennage 58. Right rear VTOL thrust rotor 93 is rearward of trailing edge 53B of right wing 53 and is mounted to and atop right tail boom support 64 between trailing edge 53B of right wing 53, and empennage 58 and, more specifically, right vertical stabilizer 61 of empennage 58. Left rear VTOL thrust rotor 91 and right rear VTOL thrust rotor 93 are equidistant from, or otherwise with respect to, left and right wings 52 and 53, respectively, and fuselage 51.

Figure 7:
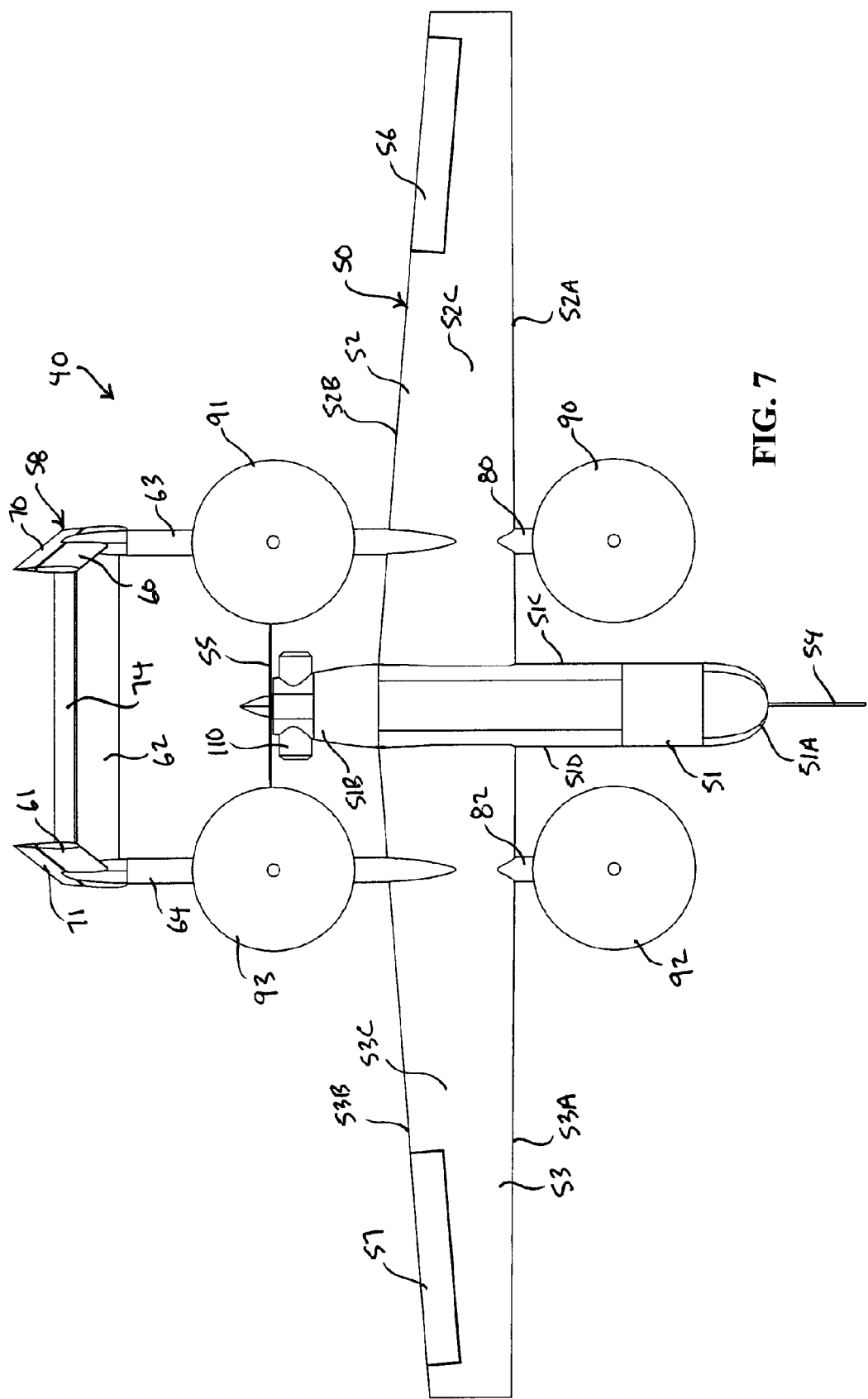
FIG. 7 is a top plan view of the embodiment of FIG. 3.

As best seen in FIG. 7, left front VTOL thrust rotor 90 diametrically opposes right front VTOL thrust rotor 92 toward leading extremity 51A of fuselage 51, and left rear VTOL thrust rotor 91 diametrically opposes right rear VTOL thrust rotor 93 toward trailing extremity 51B of fuselage 51. Left front VTOL thrust rotor 90 is in-line with respect to left rear VTOL thrust rotor 91, and right front VTOL thrust rotor 92 is in-line with respect to right rear VTOL thrust rotor 93.

Left front VTOL thrust rotor 90, left rear VTOL thrust rotor 91, right front VTOL thrust rotor 92, and right rear VTOL thrust rotor 93 are fixed rotors, which means they do not pivot, articular, or otherwise translate out of their fixed, horizontal positions. Left front VTOL thrust rotor 90, left rear VTOL thrust rotor 91, right front VTOL thrust rotor 92, and right rear VTOL thrust rotor 93 are coplanar being and operating in the same plane, and this plane is horizontal relative to airframe 50 of aircraft 40 and, more specifically, is parallel relative to, and being even/level with, top surfaces 52C and 53C of left and right wings 52 and 52 in and around the region of each of rotors 90-93, and VTOL thrust rotors 90,91,92,94 each do not extend downwardly from said plane past top surfaces 52C and 53C of left and right wings 52 and 53 so as to reside within the wing thicknesses of left and right wings 52 and 53 between top surfaces 52C,53C and bottom surfaces 52D,53D of left and right wings 52,53.

Figure 3:
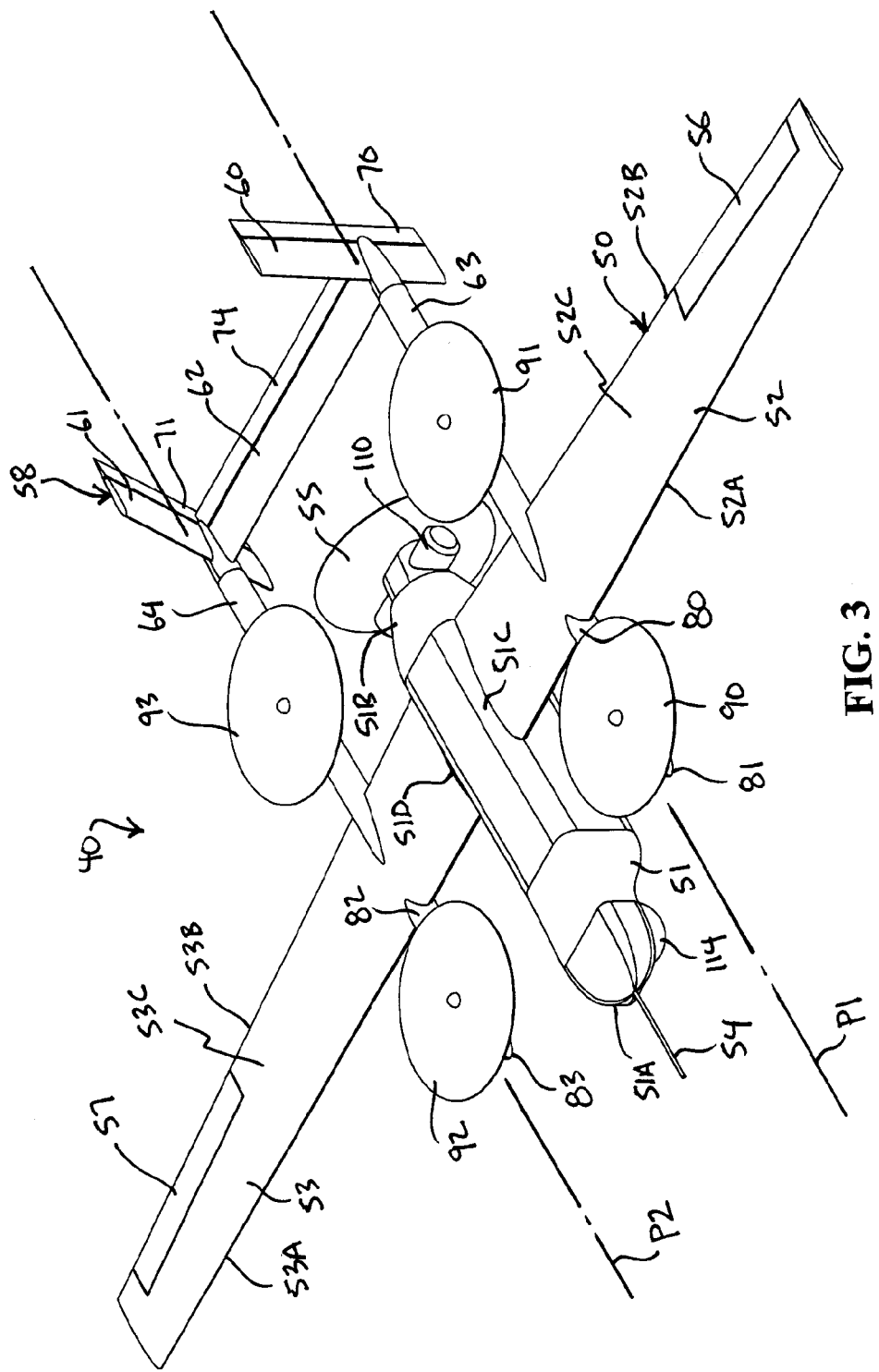
FIG. 3 is a view similar to that of FIG. 2 illustrating the four vertical thrust rotors as they would appear activated providing vertical lift, and further illustrating the forward thrust rotor as it would appear activated providing forward thrust.
Figure 4:
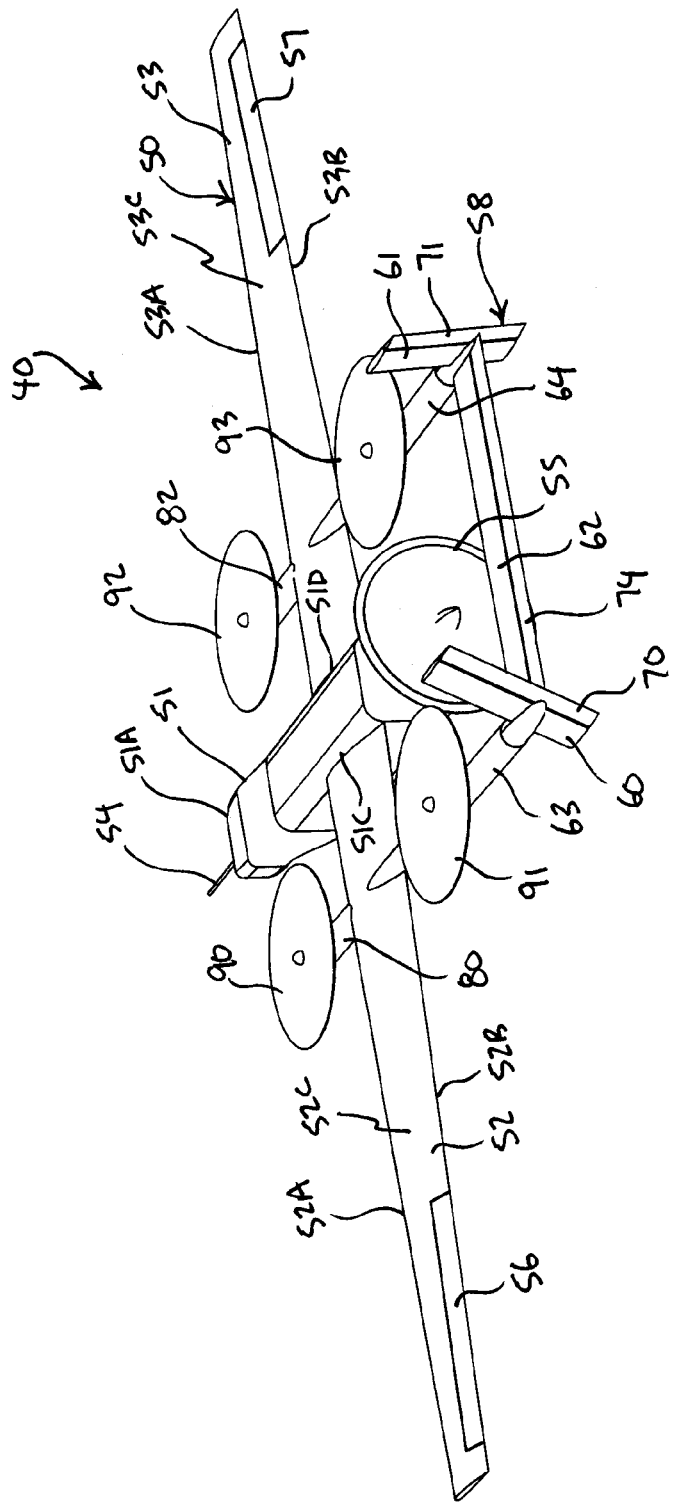
FIG. 4 is a rearward top perspective view of the embodiment of FIG. 3.
Figure 10:
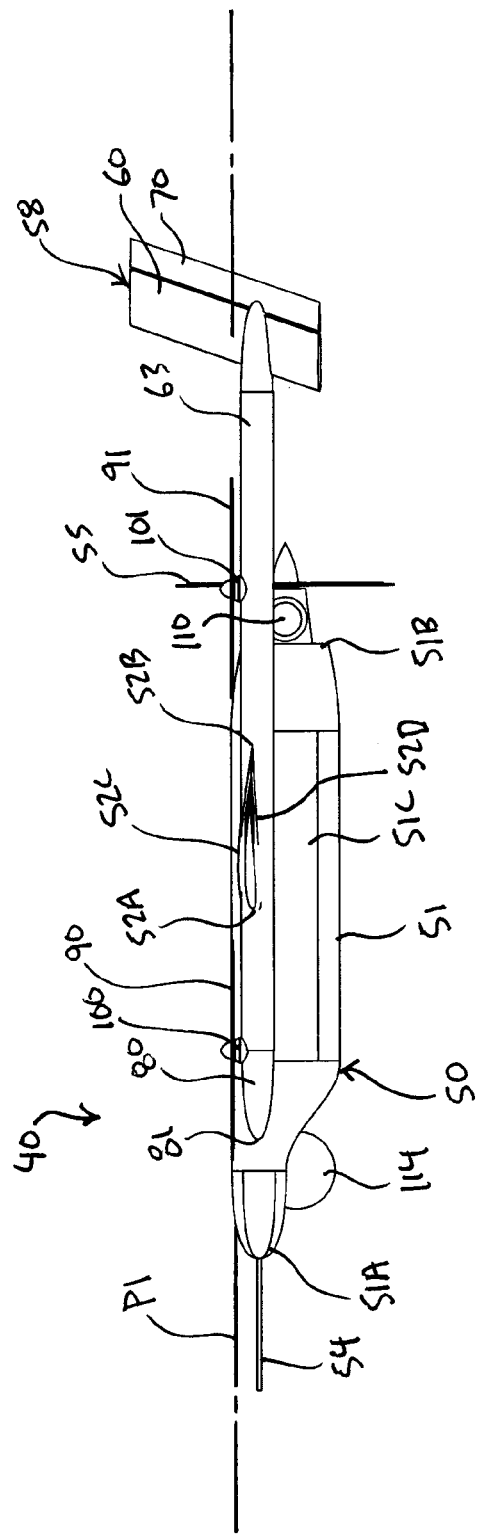
FIG. 10 is a left side elevation view of the embodiment of FIG. 1, the opposed right side elevation view being substantially the same thereof.

Specifically, left front VTOL thrust rotor 90 and left rear VTOL thrust rotor 91 are coplanar being and operating in the same or common horizontal plane denoted at P1 that is parallel with respect to, and being even or otherwise level with, the top surface 52C of left wing 52 in and around the region of left front and left rear VTOL thrust rotors 90 and 91 as seen in FIGS. 3 and 10, in which VTOL thrust rotors 90,91 each do not extend downwardly from said plane P1 past top surface 52C of left wing 52 so as to reside within the wing thickness of left wing 52 between top surface 52C and bottom surface 52D of left wing 52. In other words, left front VTOL thrust rotor 90 and left rear VTOL thrust rotor 91 are coplanar being and operating in the same or common horizontal plane denoted at P1 that is parallel with respect to, and being even or otherwise level with, the top surface 52C of left wing 52 in and around the region of left front and left rear VTOL thrust rotors 90 and 91 as seen in FIGS. 3 and 10, and VTOL thrust rotors 90,91 each do not reside within the wing thickness of left wing 52 between top surface 52C and bottom surface 52D of left wing 52. Identically to that of left front and left rear VTOL thrust rotors 90 and 91 relative to top surface 52C of left wing 52, right front VTOL thrust rotor 92 and right rear VTOL thrust rotor 93 are coplanar being and operating in the same or common horizontal plane denoted at P2 that is parallel with respect to, and being even or otherwise level with, the top surface 53C of right wing 53 in and around the region of right front and right rear VTOL thrust rotors 92 and 93 as seen in FIG. 3, in which VTOL thrust rotors 92,93 each do not extend downwardly from said plane P2 past top surface 53C of right wing 53 so as to reside within the wing thickness of right wing 53 between top surface 53C and bottom surface 53D of right wing 53. In other words, right front VTOL thrust rotor 92 and right rear VTOL thrust rotor 93 are coplanar being and operating in the same or common horizontal plane denoted at P2 that is parallel with respect to, and being even or otherwise level with, the top surface 53C of right wing 53 in and around the region of right front and right rear VTOL thrust rotors 92 and 93, and VTOL thrust rotors 92,93 each do not reside within the wing thickness of right wing 53 between top surface 53C and bottom surface 53D of right wing 53.

Furthermore, vertical vertical/forward thrust rotor 55 is perpendicular relative to VTOL rotors 90-93, and is furthermore perpendicular relative to plans P1 and P2 and, accordingly, the common horizontal plane in which VTOL rotors 90-93 reside.

Figure 9:
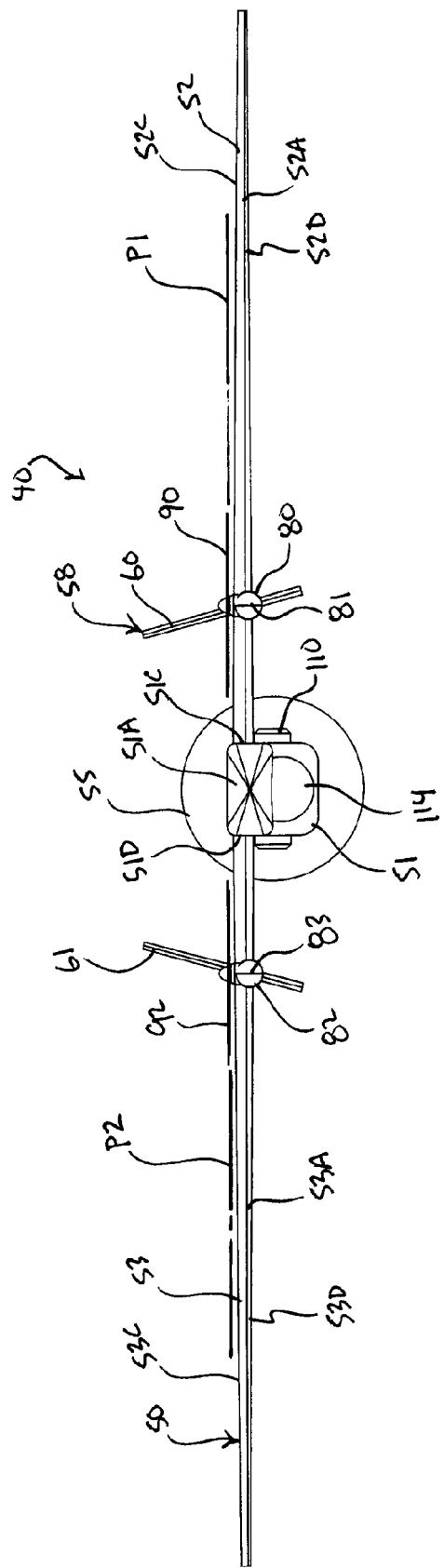
FIG. 9 is a front elevation view of the embodiment of FIG. 1.
Figure 11:
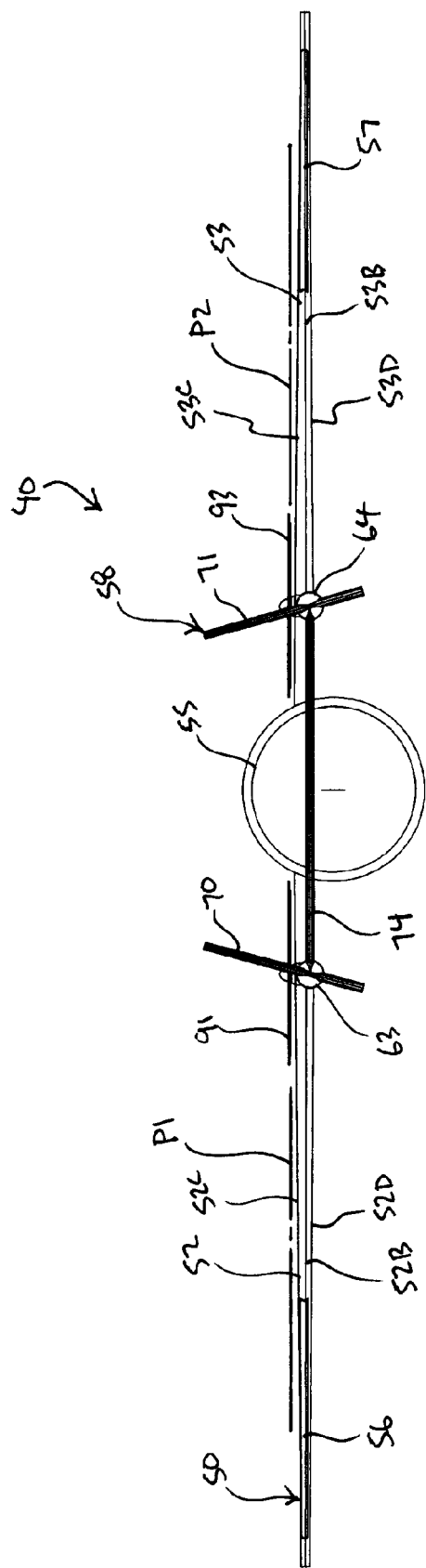
FIG. 11 is a rear elevation view of the embodiment of FIG. 1.

FIG. 9 is a front elevation view of aircraft 40 illustrating left front VTOL thrust rotor 90 residing in and extending along horizontal plane P1 that, as explained above, is parallel with respect to, and being even or otherwise level with, the top surface 52C of left wing 52 in and around the region of left front VTOL thrust rotor 90, illustrating right front VTOL thrust rotor 92 residing in and extending along the horizontal plane P2 that, as explained above, is parallel with respect to the top surface 53C of right wing 53 in and around and around the region of right front VTOL thrust rotor 92, and further illustrating horizontal plane P1 being coplanar with horizontal plane P2. Left and right rear VTOL thrust rotors 92 and 93 are similarly oriented, and because they are in-line with respect to left and right front VTOL thrust rotors 90 and 91, respectively, are directly behind the respective left and right front VTOL thrust rotors 90 and 92 in FIG. 9 and cannot be seen in FIG. 9. FIG. 11 is a rear elevation view of aircraft 40 illustrating left rear VTOL thrust rotor 91 residing in and extending along horizontal plane P1 that is, as explained above, parallel with respect to, and being even or otherwise level with, the top surface 52C of left wing 52 in and around the region of left rear VTOL thrust rotor 91, illustrating right rear VTOL thrust rotor 93 residing in and extending along the horizontal plane P2 that is, as explained above, parallel with respect to, and being even or otherwise level with, the top surface 53C of right wing 53 in and around and around the region of right rear VTOL thrust rotor 93, and further illustrating horizontal plane P1 being coplanar with horizontal plane P2. Based on this orientation of VTOL thrust rotors 90-93 relative to each other and relative to left and right wings 52 and 53, aircraft 55 has a minimal front elevation or leading cross-section for providing minimal drag during forward flight. Furthermore, VTOL thrust rotors 90-93 are each completely exposed and not surrounded and housed within thruster housings or casings. As such, VTOL thrust rotors 90-93 are "open" thrust rotors being free of thruster housings or casings, which prevents buffeting from occurring in response to the activation of VTOL thrust rotors 90-93 during operation, e.g., VTOL maneuvering.

Left front VTOL thrust rotor 90 is driven for rotation by an electric motor 100, left rear VTOL thrust rotor 91 is driven for rotation by an electric motor 101, right front VTOL thrust rotor 92 is driven for rotation by an electric motor 102, and right rear VTOL thrust rotor 93 is driven for rotation by an electric motor 103. Referencing FIG. 1, electric motors 100-103 receive electrical power from a battery pack 106. Electric motors 100-103 are electrically coupled to battery pack 106 with conventional, onboard electrical wiring. Battery pack 106 is formed with batteries, super capacitors or other like or similar battery-like technology. Battery pack 106 is supported by fuselage 51, and is housed within a payload integration area 107 formed in fuselage 51. Payload integration area 107 is located between leading and trailing ends 51A and 51B of fuselage. Forward thrust rotor 55 is driven for rotation by an internal combustion engine 110. Internal combustion engine 110 is fueled by fuel housed in an onboard fuel tank 111. Fuel tank 111 is supported by fuselage 51, and is housed within payload integration area 107. Internal combustion engine 110 is coupled in fuel communication with fuel tank 111 with one or more conventional, onboard fuel lines.

Battery pack 106 is preferably rechargeable. Battery pack 106 may be recharged by a generator. Aircraft 40 may be configured with a generator for recharging battery pack 106. Specifically, a generator for recharging battery pack 106 may be attached to internal combustion engine 110.

Aircraft 40 is an unmanned aerial vehicle (UAV) or drone, and is furnished with an onboard UAV or drone autopilot avionics and navigation package 120. Package 120 is supported by fuselage 51, and is housed within payload integration area 107. Package 120 is entirely conventional, and is operated by remote control of a navigator or pilot for remotely controlling the operation of aircraft 40, including electric motors 100-103 for activating and deactivating VTOL thrust rotors 90-93, internal combustion engine 110 for activating and deactivating forward thrust rotor 55, rudders 70 and 71 and ailerons 56 and 57 for controlling aircraft 55 flight, and other onboard aircraft 55 systems. Alternatively, package 120 may be an autonomous system, a self-directing system to provide autonomous control of the operation of aircraft 40. Package 120 receives electrical power from battery pack 106, and package 120 is electrically coupled to battery pack 106 with conventional, onboard electrical wiring.

UAVs or drones, such as aircraft 40, typically fall into one of a number of specific functional categories, including target and decoy for providing ground and aerial gunnery a target that simulates an enemy aircraft or missile, reconnaissance for providing battlefield intelligence, combat for providing attack capability for high-risk missions, logistics for providing cargo and logistics operations, research and development for developing UAV technologies, and civil and commercial applications. Multi-role airframe platforms are also prevalent in many UAV systems. In the present embodiment, aircraft 40 is configured as a reconnaissance UAV, and is furnished with an onboard and conventional camera payload 114 commonly found in known reconnaissance UAV platforms, and which is run by package 120 or through package 120 by a remote operator or pilot. In the present embodiment, camera payload 114 is supported by fuselage 51, and is used to take and collect still and/or video imagery for reconnaissance purposes. Camera payload 114 is mounted in leading extremity 51A of fuselage 51, and may be mounted elsewhere along fuselage as may be desired. Aircraft 55 may be configured with any form of reconnaissance systems for taking and collecting any desired form of reconnaissance data.

VTOL thrust rotors 90-93 provide for vertical take-off and lift or VTOL, forward thrust rotor 55 provides for forward thrust during flight. VTOL thrust rotors 90-93 are powered by electric motors 100-103, respectively, which, in in turn, are electrically powered by battery pack 106, which together form an electric powered VTOL system in aircraft 40, which is operated through package 120, such as by a remote pilot or operator, or autonomously. To provide four axis of control (roll, pitch, yaw, and vertical thrust), VTOL thrust rotors 90-93 are controlled by a mixture of control inputs to all four rotors to effect control about each of the four axis independently. Preferably, VTOL thrust rotors 91 and 92 rotate in the same direction of rotation, and VTOL thrust rotors 90 and 93 rotate in the opposite direction of rotation relative to the direction of rotation of VTOL thrust rotors 91 and 92. These respective directions of rotation of opposite and diagonal VTOL thrust rotors 91 and 92, and opposite and diagonal VTOL thrust rotors 90 and 93 can be reversed, but each pair of VTOL thrust rotors opposite each other diagonally must be turning the same direction, and the other pair must be opposite to the first pair. Those having ordinary skill will readily appreciate that this described rotation of opposite diagonal pairs of VTOL thrust rotors is a standard control method for quadrotor aerial platforms. The electrical power output of the electric powered VTOL system during VTOL flight is greater than that of forward thrust rotor 55 used to provide forward thrust during forward flight of aircraft 40. The electric powered VTOL system has minimal endurance for providing dedicated VTOL, which keeps the electric powered VTOL system weight as low as possible. In the present embodiment, aircraft 40 has four VTOL thrust rotors 90-93 and is exemplary of a quadrotor system as described herein.

Forward thrust rotor 55 is powered by internal combustion engine 110 to provide maximize endurance during forward flight of aircraft 40, which is operated through package 120, such as by a remote pilot or operator, or autonomously. In an alternate UAV configuration according to an alternate embodiment of the invention, forward thrust rotor 55 may be powered by an electric motor like VTOL thrust rotors 90-93.

Figure 8:
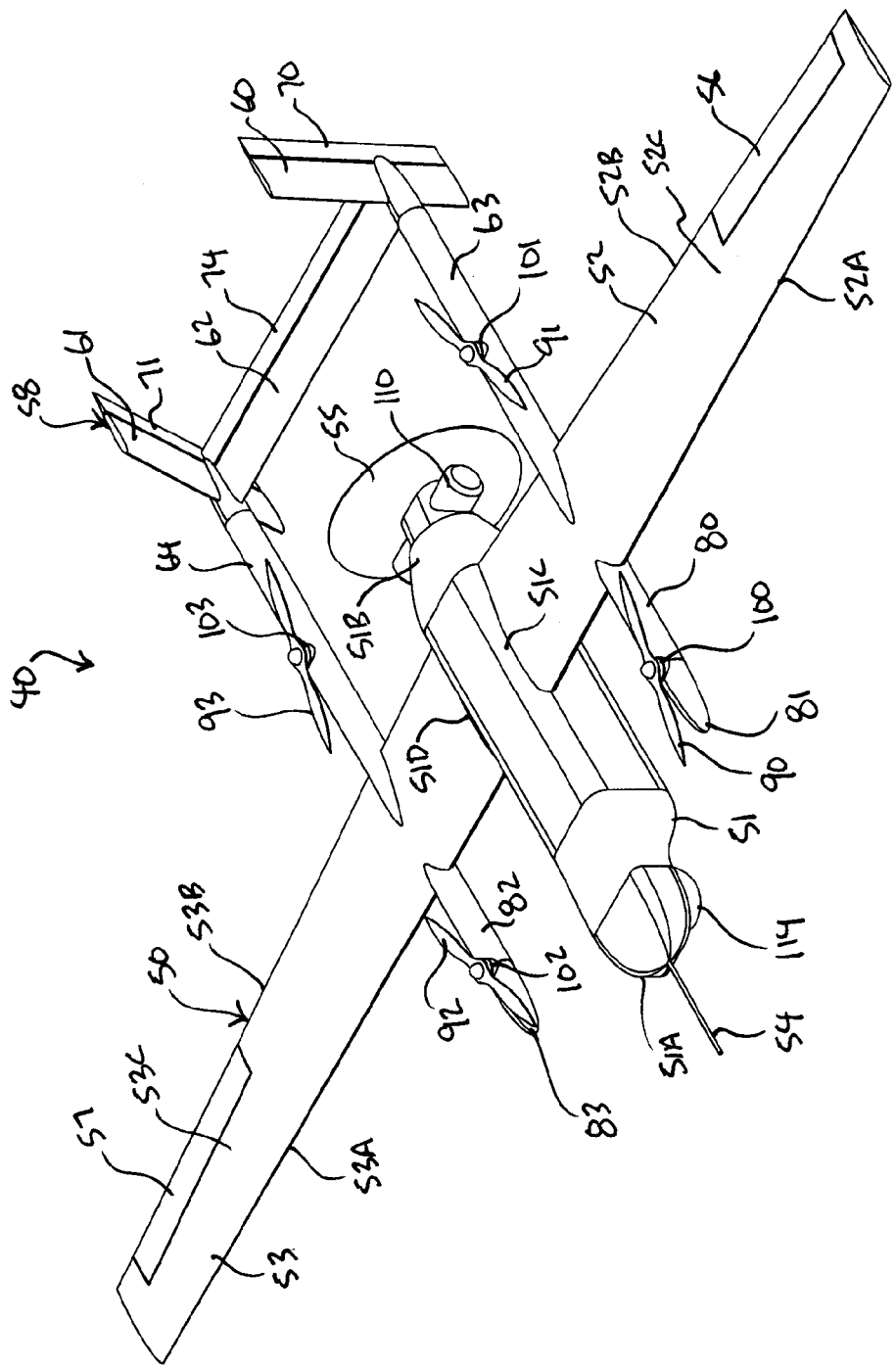
FIG. 8 is a frontal top perspective view of the embodiment of FIG. 1 illustrating the four vertical thrust rotors and the forward thrust rotor as they would appear deactivated, and further illustrating the forward thrust rotor as it would appear activated providing forward thrust.

When performing VTOL maneuvers, VTOL thrust rotors 90-93 are activated for rotation as shown in FIGS. 3-7 and 9 to provide vertical lift through the activation of electric motors 100-103. In forward flight, forward thrust rotor 55 is activated for rotation as shown in FIG. 8 to provide forward thrust through the activation of internal combustion engine 110, and VTOL thrust rotors 90-93 are deactivated and inactive and do not rotate as shown in FIG. 8. Because left front VTOL thrust rotor 90 and left rear VTOL thrust rotor 91 reside along first common horizontal plane P1 that is parallel with respect to, and being even or otherwise level with, the top surface of left wing 52 in and around the regions of rotors 90 and 91, because right front VTOL thrust rotor 92 and right rear VTOL thrust rotor 93 reside along a second common horizontal plane P2 that is parallel with respect to, and being even or otherwise level with, the top surface of right wing 53 in and around the region of rotors 92 and 93, because the horizontal plane P2 of left front and rear VTOL thrust rotors 90 and 91 is common to the horizontal plane P2 of right front and rear VTOL thrust rotors 92 and 93 as shown in FIG. 9, because left front VTOL thrust rotor 90 is in-line with respect to left rear VTOL thrust rotor 91, and because right front VTOL thrust rotor 92 is in-line with respect to right rear VTOL thrust rotor 93, left front and rear VTOL thrust rotors 90-91 are aligned along the airflow path along top surface 52C of left wing 52, and right front and rear VTOL thrust rotors 92 and 93 are aligned along the airflow path along top surface 53C of right wing 53, and this limits the drag from VTOL thrust rotors 90-93 during forward flight of aircraft 40 when VTOL thrust rotors 90-93 are inactive, according to the principle of the invention. In VTOL maneuvering of aircraft 40 with the activation of VTOL thrust rotors 90-93, forward thrust rotor 55 is also preferably activated as shown in FIG. 3 to provide forward thrust so as to compensate for wind, and to provide forward acceleration to a predetermined fixed-wing flight speed, at which point VTOL thrust rotors 90-93 are deactivated and become idle to reduce electrical power drain from battery pack 106.

Furthermore, because left front VTOL thrust rotor 90 and left rear VTOL thrust rotor 91 each do not reside within the wing thickness of left wing 52 between top surface 52C and bottom surface 52D of left wing 52, VTOL thrust rotors 90 and 91 are uniquely positioned so as to not interfere with the active air flows across top and bottom surfaces 52C and 52D of left wing 52 during forward flight of aircraft 40 and thus do not compromise, limit, or interfere with the forward flight characteristics of left wing 52 when VTOL rotors 90 and 91 are deactivated during forward flight of aircraft 40, in accordance with the principle of the invention. Moreover, because right front VTOL thrust rotor 92 each do not reside within the wing thickness of right wing 53 between top surface 53C and bottom surface 53D of right wing 53, VTOL thrust rotors 92 and 93 are uniquely positioned so as to not interfere with the active air flows across top and bottom surfaces 53C and 53D of right wing 53 during forward flight of aircraft 40 and thus do not compromise, limit, or interfere with the forward flight characteristics of right wing 53 when VTOL rotors 92 and 93 are deactivated during forward flight of aircraft 40, in accordance with the principle of the invention.

Conventional UAV platforms require either large devices to launch and recover, or a runway. Both options place substantial restrictions on when and where an UAV may operate. The VTOL UAV platform of aircraft 40 improves launch and recovery logistics by providing the ability to vertically launch and recover from small, clear areas. Furthermore, existing VTOL UAV platforms are inefficient compared to standard fixed-wing aircraft of similar size and payload capacity, resulting in shorter flight times. The VTOL UAV platform of aircraft 40 combines the VTOL performance of a quad rotor VTOL thrust rotor platform with the forward flight efficiency of a standard fixed-wing aircraft. Also, while existing convertible UAV platforms require complex control schemes and cannot hold position in windy conditions due to a large front elevation cross section when in VTOL mode, the architecture of the VTOL UAV according to aircraft 40 requires less complex control schemes and has a minimal front elevation or leading cross section in VTOL mode allowing it to maintain position in windy and turbulent conditions during VTOL maneuvering.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A vertical take-off and landing aircraft, comprising:
    a fixed wing airframe having opposed left and right wings extending from left and right sides, respectively, of a fuselage having opposed leading and trailing extremities and an empennage located behind the trailing extremity, the left and right wings each having opposed top and bottom surfaces and a wing thickness between the top and bottom surfaces;
    four fixed and horizontal vertical take-off and landing (VTOL) thrust rotors mounted to the airframe in a quadrotor pattern for providing vertical lift to the aircraft, the VTOL thrust rotors are each open so as to be free of thruster housings or casings for limiting drag on the aircraft during flight, and for preventing buffeting from occurring in response to activation of the VTOL thrust rotors during VTOL maneuvering of the aircraft;
    a vertical, forward thrust rotor mounted to the trailing extremity of the fuselage between the trailing extremity of the fuselage and the empennage for providing forward thrust to the aircraft; and
    the four VTOL thrust rotors are coplanar being and operating in a common plane that is parallel relative to, and that is even with, the top surfaces of the left and right wings in and around a region of each of the four VTOL thrust rotors, and do not extend downwardly from the common plane past the top surfaces of the respective left and right wings so as to not reside within the wing thicknesses of the respective left and right wings between the top and bottom surfaces of the respective left and right wings, all for limiting drag from the VTOL thrust rotors during flight of the aircraft when the VTOL thrust rotors are inactive, and for preventing the VTOL thrust rotors from interfering with the active air flows across top and bottom surfaces of the respective left and right wings during flight of the aircraft.

2. The vertical take-off and landing aircraft according to claim 1, wherein each of the four VTOL thrust rotors is driven by an electric motor.

3. The vertical take-off and landing aircraft according to claim 2, wherein the vertical, forward thrust rotor is drive by an internal combustion engine.

4. The vertical take-off and landing aircraft according to claim 3, wherein the four VTOL thrust rotors include left front and rear VTOL thrust rotors located outboard of the left side of the fuselage between the leading extremity of the fuselage and the empennage, and right front and rear VTOL thrust rotors located outboard of the right side of the fuselage between the leading extremity of the fuselage and the empennage.

5. The vertical take-off and landing aircraft according to claim 4, wherein the left front and right front VTOL thrust rotors are equidistant with respect to the left and right wings, respectively, and the fuselage.

6. The vertical take-off and landing aircraft according to claim 5, wherein the left rear and right rear VTOL thrust rotors are equidistant with respect to the left and right wings, respectively, and the fuselage.

7. The vertical take-off and landing aircraft according to claim 6, wherein:
    the left front VTOL thrust rotor is diametrically opposed with respect to the right front VTOL thrust rotor;
    the left rear VTOL thrust rotor is diametrically opposed with respect to the right rear VTOL thrust rotor;
    the left front VTOL thrust rotor is in-line with respect to the left rear VTOL thrust rotor; and
    the right front VTOL thrust rotor is in-line with respect to the right rear VTOL thrust rotor.

8. A vertical take-off and landing aircraft, comprising:
    a fuselage having opposed leading and trailing extremities and opposed left and right sides;
    opposed left and right wings extending from the left and right sides, respectively, of the fuselage between the opposed leading and trailing extremities of the fuselage, the left and right wings each having opposed leading and trailing edges, opposed top and bottom surfaces extending between the opposed leading and trailing edges, and a wing thickness between the top and bottom surfaces;
    opposed left and right tail booms coupled between the opposed left and right wings, respectively, and an empennage behind the trailing extremity of the fuselage;
    opposed left and right head booms coupled to the left and right wings, respectively, and extending forwardly of the leading edges of the left and right wings, respectively;
    a plurality of fixed and horizontal vertical take-off and landing (VTOL) thrust rotors for providing vertical lift to the aircraft, including a left front VTOL thrust rotor mounted to the left head boom and being positioned forwardly of the leading edge of the left wing outboard of the left side of the fuselage near the leading extremity of the fuselage, a left rear VTOL thrust rotor mounted to the left tail boom and being positioned rearwardly of the trailing edge of the left wing outboard of the left side of the fuselage near the trailing extremity of the fuselage, a right front VTOL thrust rotor mounted to the right head boom and being positioned forwardly of the leading edge of the right wing outboard of the right side of the fuselage near the leading extremity of the fuselage, and a right rear VTOL thrust rotor mounted to the right tail boom and being positioned rearwardly of the trailing edge of the right wing outboard of the right side of the fuselage near the trailing extremity of the fuselage, and the VTOL thrust rotors are each open so as to be free of thruster housings or casings for limiting drag on the aircraft during flight, and for preventing buffeting from occurring in response to activation of the VTOL thrust rotors during VTOL maneuvering of the aircraft;

the left front VTOL thrust rotor, the left rear VTOL thrust rotor, the right front VTOL thrust rotor, and the right rear VTOL thrust rotor being and operating in a common plane that is parallel relative to, and that is even with, the top surfaces of the left and right wings in and around a region of each of the left front, left rear, right front, and right rear VTOL thrust rotors, and do not extend downwardly from the common plane past the top surfaces of the respective left and right wings so as to not reside within the wing thicknesses of the respective left and right wings between the top and bottom surfaces of the respective left and right wings, all for limiting drag from the VTOL thrust rotors during flight of the aircraft when the VTOL thrust rotors are inactive, and for preventing the VTOL thrust rotors from interfering with the active air flows across top and bottom surfaces of the respective left and right wings during flight of the aircraft; and a vertical, forward thrust rotor mounted to the trailing extremity of the fuselage between the rear extremity of the fuselage and the empennage for providing forward thrust to the aircraft.

9. The vertical take-off and landing aircraft according to claim 8, wherein each of the left front, left rear, right front, and right rear VTOL thrust rotors is driven by an electric motor.

10. The vertical take-off and landing aircraft according to claim 9, wherein the vertical, forward thrust rotor is drive by an internal combustion engine.

11. The vertical take-off and landing aircraft according to claim 10, wherein the left head boom is in-line and coaxial with respect to the left tail boom.

12. The vertical take-off and landing aircraft according to claim 11, wherein the right head boom is in-line and coaxial with respect to the right tail boom.

13. The vertical take-off and landing aircraft according to claim 12, wherein the opposed left and right tail booms are coextensive and parallel with respect to each other.

14. The vertical take-off and landing aircraft according to claim 13, wherein the opposed left and right head booms are coextensive and parallel with respect to each other.

15. The vertical take-off and landing aircraft according to claim 14, wherein the left front and right front VTOL thrust rotors are equidistant with respect to the left and right wings, respectively, and the fuselage.

16. The vertical take-off and landing aircraft according to claim 15, wherein the left rear and right rear VTOL thrust rotors are equidistant with respect to the left and right wings, respectively, and the fuselage.

17. The vertical take-off and landing aircraft according to claim 16, wherein the left front VTOL thrust rotor is diametrically opposed with respect to the right front VTOL thrust rotor.

18. The vertical take-off and landing aircraft according to claim 17, wherein the left rear VTOL thrust rotor is diametrically opposed with respect to the right rear VTOL thrust rotor.

19. The vertical take-off and landing aircraft according to claim 18, wherein the left front VTOL thrust rotor is in-line with respect to the left rear VTOL thrust rotor.

20. The vertical take-off and landing aircraft according to claim 19, wherein the right front VTOL thrust rotor is in-line with respect to the right rear VTOL thrust rotor.

\* \* \* \* \*